United States Patent [19]

Nomura et al.

[11] 4,434,352
[45] Feb. 28, 1984

[54] ARC WELDING METHOD FOR AUTOMATICALLY REVERSING A WELDING TORCH IN THE WIDTH DIRECTION OF THE GROOVE AT A SET POSITION

[75] Inventors: Hirokazu Nomura; Yuji Sugitani, both of Tsu; Yasuo Suzuki, Hisai, all of Japan

[73] Assignee: Nippon Kokan Kabushiki Kaisha, Tokyo, Japan

[21] Appl. No.: 375,202

[22] Filed: May 5, 1982

[51] Int. Cl.$^3$ .............................................. B23K 9/12
[52] U.S. Cl. .......................... 219/125.12; 219/124.03; 219/124.22
[58] Field of Search ...................... 219/125.12, 124.02, 219/124.03, 124.22, 124.34

[56] References Cited

U.S. PATENT DOCUMENTS 3,264,447  8/1966  Agnew ............................ 219/124.02
3,694,621  9/1972  Wofsey ........................... 219/124.03
4,316,075  2/1982  Isoya et al. ....................... 219/124.22

FOREIGN PATENT DOCUMENTS 2737055   3/1978  Fed. Rep. of Germany .
2233126  10/1974  France .
54-19445  2/1979  Japan .......................... 219/125.12
2000864   2/1979  United Kingdom .
2090434   7/1982  United Kingdom .

Primary Examiner—C. C. Shaw
Attorney, Agent, or Firm—Frishauf, Holtz, Goodman & Woodward

[57] ABSTRACT

In an automatic arc-welding method, which comprises: continuously moving a carriage along the longitudinal direction of a groove formed between the objects of welding; reciprocally moving in the width direction of the groove a welding electrode directed substantially vertically to said groove through a welding torch fitted to said carriage, following the groove face of said groove; producing an arc between the top of said electrode and said groove; moving said torch vertically up and down so that the value ($E_v$) of the arc voltage or arc current agrees with a previously set value ($E_o$); on the other hand, continuously detecting a vertical position of said torch as a value of voltage ($e_Y$) indicated by a potentiometer; reversing the direction of movement of said torch in the width direction of said groove at the moment when said value of voltage ($e_Y$) agrees with a prescribed value of voltage; thereby welding said objects of welding in the longitudinal direction of said groove; the improvement characterized by: said prescribed value of voltage, for one movement of said torch in the width direction of said groove, being equal to a value of sum ($e_H+e_V$) of a previously set value of voltage ($e_H$) and a value of voltage ($e_V$) corresponding to a deviation ($\Delta L$) of the distance between said carriage and said objects of welding from a previously set distance (L).

2 Claims, 2 Drawing Figures

4,434,352

ARC WELDING METHOD FOR AUTOMATICALLY REVERSING A WELDING TORCH IN THE WIDTH DIRECTION OF THE GROOVE AT A SET POSITION

REFERENCE TO PATENTS, APPLICATIONS AND PUBLICATIONS PERTINENT TO THE INVENTION (1) Japanese Patent Provisional Publication No. 19,445/79 dated Feb. 14, 1979.

The contents of the above-mentioned prior document will be described under the heading of the "BACKGROUND OF THE INVENTION" hereinafter.

FIELD OF THE INVENTION

The present invention relates to an automatic arc-welding method which comprises reciprocally moving a welding torch, following the face of a groove formed between the objects of welding, in the width direction of said groove, and, at the same time, continuously moving said torch in the longitudinal direction of said groove, to automatically weld said objects of welding together in the longitudinal direction of said groove.

BACKGROUND OF THE INVENTION

An arc-welding method is known, which comprises, when welding the objects of welding together in the longitudinal direction of a groove formed between the objects of welding by the arc-welding method using a consumable or non-consumable welding electrode, reciprocally moving a welding torch, following the face of the groove, in the width direction of said groove, and, at the same time, continuously moving said torch in the longitudinal direction of said groove, to automatically weld the objects of welding together in the longitudinal direction of the groove.

As a welding method as mentioned above, we proposed an arc-welding method as disclosed in Japanese Patent Provisional Publication No. 19,445/79 dated Feb. 14, 1979 (hereinafter referred to as the "prior art"). The prior art is a method which comprises detecting the position of the welding electrode in a groove by means of arc current or arc voltage of an arc produced between the welding electrode and the groove, and welding the objects of welding together while controlling the position of the welding electrode on the basis of the result of detection, as summarized as follows:

The method of the prior art comprises: continuously moving a carriage along the longitudinal direction of a groove formed between the objects of welding, fitting a welding torch to said carriage so that said torch is directed substantially vertically to said groove, said torch moving together with said carriage; directing a welding electrode through said torch toward said groove; feeding a welding current to said electrode to produce an arc between the tip of said electrode and said groove to weld said objects of welding together by means of the arc heat along said groove; continuously moving said torch, during travel of said carriage, in the width direction of said groove while continuing welding; continuously detecting a value ($E_v$) of one arc voltage and arc current of said arc; continuously calculating a deviation ($E_o - E_v$) of the thus detected value ($E_v$) from a previously set value ($E_o$) of one of arc voltage and arc current; continuously moving said torch vertically up and down, during travel of said carriage, so that said deviation ($E_o - E_v$) becomes null, thereby maintaining the distance between the tip of said electrode and said groove always at a prescribed distance (l) during the movement of said torch in the width direction of said groove; continuously detecting a vertical position of said torch as a value of voltage ($e_V$) indicated by a potentiometer for each movement of said torch in the with direction of said groove; reversing the direction of movement of said torch in the width direction of said groove at the moment when said value of voltage ($e_V$) thus detected agrees with a previously set value of voltage ($e_H$); repeating said movement of said torch in the width direction of said groove, said movement of said torch in the vertical direction and said reversal of the direction of the movement of said torch in the width direction of said groove; on the other hand, continuously moving said torch in the longitudinal direction of said groove, while continuing welding, together with said carriage; thereby reciprocally moving said torch in the width direction of said groove following the face of said groove while maintaining the distance between the tip of said electrode and said groove always at said prescribed distance (l), and, at the same time, moving said torch in the longitudinal direction of said groove so as to weld said objects of welding in the longitudinal direction of said groove.

According to the prior art presented above, since it is possible to detect the position of the welding electrode in a groove by means of arc current or arc voltage and carry out welding while moving the welding torch reciprocally in the width direction of the groove, thus permitting welding, accurately following the welding line.

However, the above-mentioned prior art was found to involve the following problems. Even if the objects of welding have flat surfaces, rails for travelling the carriage on which a welding machine is mounted, laid in parallel with the longitudinal direction of the groove on the object of welding may sometimes curve up or down relative to the objects of welding, or even if the rails are laid straight, the objects of welding may sometimes curve up or down. According to the prior art, reversal in the reciprocating motion of the welding torch in the width direction of the groove is effected at the moment when the detected value of voltage representing the position of the welding electrode agrees with a certain value of voltage indicating the reversing position of the torch which has previously been set on the assumption that the distance between said carriage and the objects of welding is kept at a previously set distance. Therefore, when the distance between said carriage and the objects of welding deviates from the previously set distance under the effect of curved rails or curved objects of welding as mentioned above, the moving direction of the torch is reversed at a point other than a previously set position of reversal. This results in a formed bead becoming irregular in height, a defective penetration and production of welding defects, thus making it impossible to obtain a sound weld.

SUMMARY OF THE INVENTION

An object of the present invention is therefore to provide an automatic arc-welding method which makes it possible, when automatically welding the objects of welding in the longitudinal direction of a groove by reciprocally moving in the width direction of the groove a welding torch directed substantially vertically to the groove formed between the objects of welding, following the face of said groove, and at the same time, moving said torch in the longitudinal direction of said objects of welding, to automatically conduct reversal of the moving direction of the torch in the width direction of the groove at a previously set constant position even if the distance between a carriage mounting a welding machine thereon and the objects of welding deviates from a previously set distance, thus permitting formation of a bead having a uniform height.

In accordance with one of the features of the present invention, there is provided: in an automatic arc-welding method, which comprises: continuously moving a carriage along the longitudinal direction of a groove formed between objects of welding; fitting a welding torch to said carriage so that said torch is directed substantially vertically to said groove, said torch moving together with said carriage; directing a welding electrode through said torch toward said groove; feeding a welding current to said electrode to produce an arc between the tip of said electrode and said groove to weld said objects of welding together by means of the arc heat along said groove; continuously moving said torch, during travel of said carriage, in the width direction of said groove while continuing welding; continuously detecting a value ($E_v$) of the arc voltage or arc current of said arc; continuously calculating a deviation ($E_o-E_v$) of the thus detected value ($E_v$) from a previously set value ($E_o$) of the arc voltage or arc current; continuously moving said torch vertically up and down, during travel of said carriage, so that said deviation ($E_o-E_v$) becomes null, thereby maintaining the distance between the tip of said electrode and said groove always at a prescribed distance (l) during the movement of said torch in the width direction of said groove; continuously detecting a vertical position of said torch as a value of voltage ($e_V$) indicated by a potentiometer for each movement of said torch in the width direction of said groove; reversing the direction of movement of said torch in the width direction of said groove at the moment when said value of voltage ($e_V$) thus detected agrees with a prescribed value of voltage; repeating said movement of said torch in the width direction of said groove, said movement of said torch in the vertical direction and said reversal of the direction of the movement of said torch in the width direction of said groove; on the other hand, continuously moving said torch in the longitudinal direction of said groove, while continuing welding, together with said carriage; thereby reciprocally moving said torch in the width direction of said groove following the face of said groove while maintaining the distance between the tip of said electrode and said groove always at said prescribed distance (l), and, at the same time, moving said torch in the longitudinal direction of said groove so as to weld said objects of welding in the longitudinal direction of said groove;

the improvement characterized by:

said prescribed value of voltage, for one movement of said torch in the width direction of said groove, for the purpose of reversing the direction of movement of said torch in the width direction of said groove being equal to the sum ($e_H+e_V$) of a previously set value of voltage ($e_H$) and a value of voltage ($e_V$) corresponding to a deviation ($\Delta L$) of the distance between said carriage and said objects of welding from a previously set distance (L).

FIG. 1 is a descriptive view illustrating the principle of the present invention; and, FIG. 2 is a block diagram illustrating an embodiment of the present invention.

DETAILED DESCRIPTION OF THE PREFERRED EMBODIMENTS

Figure 1:
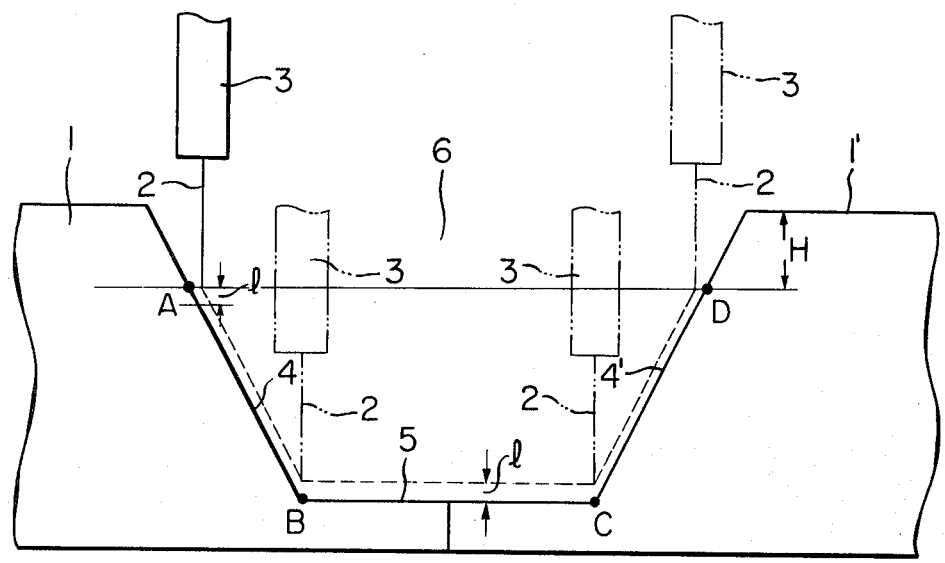

With a view to solving the above-mentioned problems in the arc-welding of the objects of welding, we carried out extensive studies.

As a result, we found that, by continuously detecting, as a value of voltage, the deviation of the distance between a carriage on which a welding machine is mounted and the objects of welding from a previously set distance, calculating the sum of said value of voltage and a value of voltage previously set for reversing the moving direction of a torch in the width direction of a groove, and reversing the moving direction of the torch in the width direction of the groove at the moment when the value of voltage of the torch continuously detected agrees with said calculated sum of values of voltage, it is possible to form a bead having always a uniform height even if the distance between said carriage and the objects of welding varies.

The present invention was made on the basis of the above-mentioned finding, and is as follows: in an automatic arc-welding method, which comprises:

continuously moving a carriage along the longitudinal direction of a groove formed between objects of welding; fitting a welding torch to said carriage so that said torch is directed substantially vertically to said groove, said torch moving together with said carriage; directing a welding electrode through said torch toward said groove; feeding a welding current to said electrode to produce an arc between the tip of said electrode and said groove to weld said objects of welding together by means of the arc heat along said groove; continuously moving said torch, during travel of said carriage, in the width direction of said groove while continuing welding; continuously detecting a value ($E_v$) of the arc voltage or arc current of said arc; continuously calculating a deviation ($E_o-E_v$) of the thus detected value ($E_v$) from a previously set value ($E_o$) of the arc voltage or arc current; continuously moving said torch vertically up and down, during travel of said carriage, so that said deviation ($E_o-E_v$) becomes null, thereby maintaining the distance between the tip of said electrode and said groove always at a prescribed distance (l) during the movement of said torch in the width direction of said groove; continuously detecting a vertical position of said torch as a value of voltage ($e_V$) indicated by a potentiometer for each movement of said torch in the width direction of said groove; reversing the direction of movement of said torch in the width direction of said groove at the moment when said value of voltage ($e_V$) thus detected agrees with a prescribed value of voltage; repeating said movement of said torch in the width direction of said groove, said movement of said torch in the vertical direction and said reversal of the direction of the movement of said torch in the width direction of said groove; on the other hand, continuously moving said torch in the longitudinal direction of said groove, while continuing welding, together with said carriage; thereby reciprocally moving said torch in the width direction of said groove following the face of said groove while maintaining the distance between the tip of said electrode and said groove always at said prescribed distance (l), and, at the same time, moving said torch in the longitudinal direction of said groove so as to weld said objects of welding in the longitudinal direction of said groove; the improvement characterized by:

said prescribed value of voltage, for one movement of said torch in the width direction of said groove, for the purpose of reversing the direction of movement of said torch in the width direction of said groove being equal to the sum of ($e_H+e_V$) of a previously set value of voltage ($e_H$) and a value of voltage ($e_V$) corresponding to a deviation ($\Delta L$) of the distance between said carriage and said objects of welding from a previously set distance (L).

Now, the automatic arc-welding method of the present invention is described with reference to the drawings. In FIG. 1, 1 and 1' are objects of welding; 6 is a groove which comprises inclined opposite faces 4 and 4' opening upward and a bottom face 5, and is formed between the objects of welding 1 and 1'; 2 is a welding electrode inserted substantially vertically into the groove 6; 3 is a welding torch for inserting the welding electrode 2, said welding electrode 2 may be a consumable electrode, i.e., a wire fed at a constant rate or may be a non-consumable electrode. An arc is produced between the tip of the welding electrode 2 and the groove 6 to weld the objects of welding 1 and 1' together by means of the arc heat. The welding position of the groove 6 is shielded from the open air by a shielding gas ejected from the tip of the torch 3 or ejected from a nozzle (not shown) separately provided.

The torch 3 goes down, as shown by the two-point chain line in FIG. 1, from point A on the inclined face 4 on one side along the inclined face 4 to point B on the bottom face 5, then moves along the bottom face 5 to point C, and then rises along the inclined face 4' on the other side to point D. During this movement of the torch 3 following the face of the groove 6 between the objects of welding 1 and 1', the torch 3 is vertically moved up and down so as to maintain the arc voltage or the arc current of the arc produced between the tip of the welding electrode 2 and the groove 6 always at a constant value, thereby maintaining the distance between the tip of the welding electrode 2 and the groove 6 at a prescribed distance. The vertical position of the torch 3 moving vertically up and down relative to the groove 6 is continuously detected as a value of voltage for each movement of the torch in the width direction of the groove 6. When said detected value of voltage agrees with the value of voltage produced at the moment when the welding electrode 2 rises to a point at a prescribed distance (H) from the top of the groove 6, that is, the value of voltage indicating the position of the tip of the welding electrode 2 at points A and D in FIG. 1, the direction of movement of the torch 3 in the width direction of the groove 6 is reversed.

Figure 2:
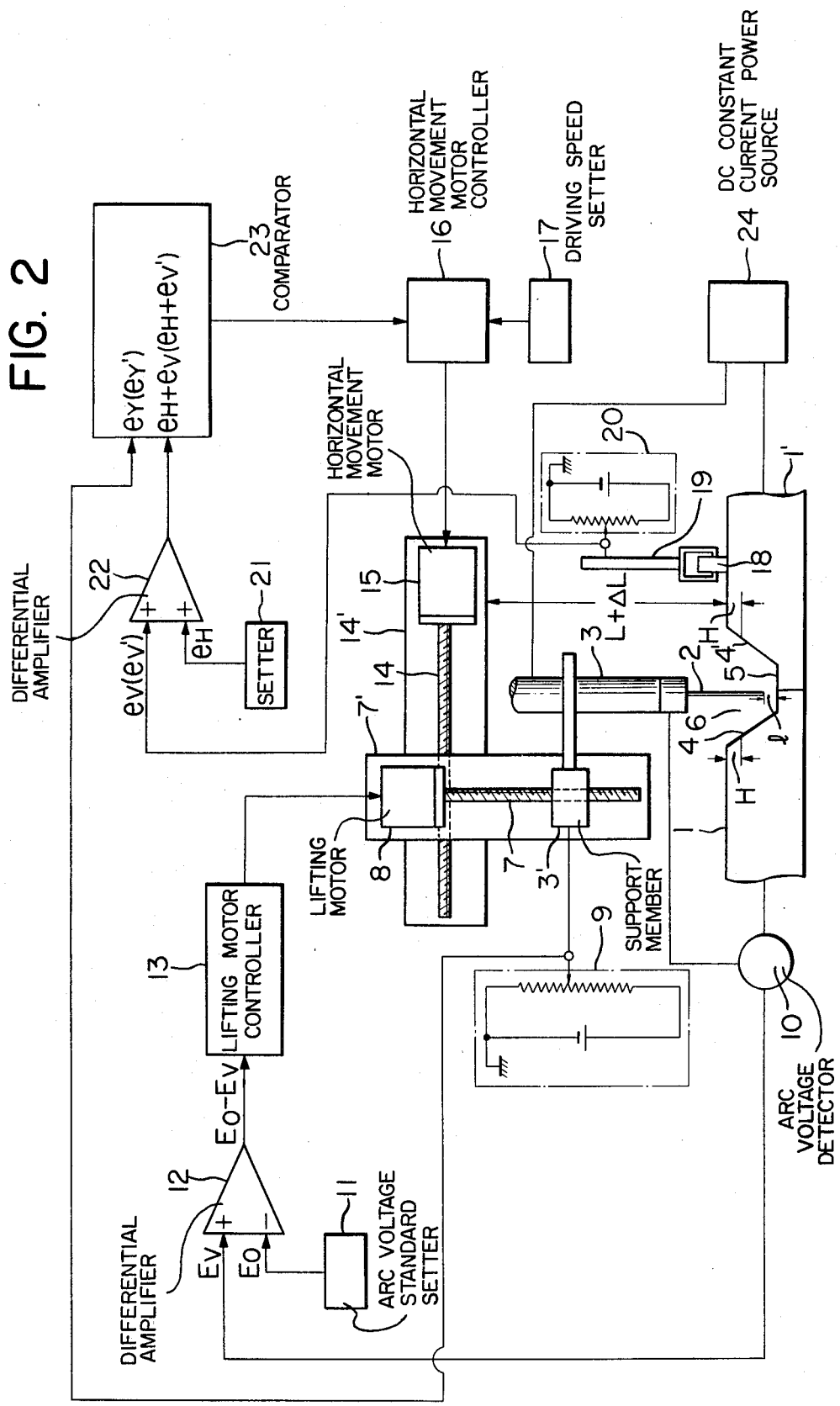

FIG. 2 is a block diagram illustrating an embodiment of the present invention, which represents a case in which the torch 3 is vertically moved up and down so as to maintain the arc voltage of the arc produced between the tip of the welding electrode 2 and the groove 6 always at a constant value. In FIG. 2, the torch 3 having therethrough the welding electrode 2 inserted substantially vertically into the groove 6 formed between the objects of welding 1 and 1' is moved in the longitudinal direction of the groove 6 by a carriage (not shown) travelling on rails (not shown) installed on one of the objects of welding 1 and 1' in parallel with the longitudinal direction of the groove 6.

In FIG. 2, 7 is a vertical screw stock for moving the torch 3 vertically up and down; 7' is a fitting of the vertical screw stock 7; 8 is a lifting motor, provided on the top of the fitting 7', for rotating the vertical screw stock 7 to move the torch 3 vertically up and down; and a support member 3' for supporting the torch 3 threadably engages with the vertical screw stock 7. Also in this figure, 14 is a horizontal screw stock for horizontally moving the torch 3; 14' is a fitting of the horizontal screw stock 14, the fitting 14' being fixed to said carriage; 15 is a horizontal movement motor, provided at one end of the fitting 14', for rotating the horizontal screw stock 14 to horizontally move the torch 3; and the fitting 7', to which the vertical screw stock 7 is fitted, engages threadably with the horizontal screw stock 14. Therefore, the torch 3 is moved vertically up and down while being moved in the width direction of the groove 6 by the drives of the lifting motor 8 and the horizontal movement motor 15.

Also in FIG. 2, 10 is an arc voltage detector connected between the torch 3 and one of the objects of welding 1; 11 is an arc voltage standard setter; 12 is a differential amplifier for calculating the deviation of the value of arc voltage detected by the arc voltage detector 10 from a value of arc voltage previously set by the arc voltage standard setter 11 and for amplifying this deviation to a certain level to issue a deviation signal to a lifting motor controller described below; and 13 is the lifting motor controller which controls driving of the lifting motor 8 and reversal of the driving direction thereof on the basis of the deviation signal issued by the differential amplifier 12. The value of arc voltage detected by the arc voltage detector 10 is compared by the differential amplifier 12 with the value of arc voltage previously set by the arc voltage standard setter 11. The differential amplifier 12 calculates the deviation of the detected value of arc voltage from the previously set value of arc voltage and feeds the lifting motor controller 13 with this deviation signal, whereby the lifting motor controller 13 drives the lifting motor 8 so as to bring said deviation signal to null. Thus, the torch 3 moving in the width direction of the groove 6 is controlled so that the distance between the tip of the welding electrode 2 and the groove 6 is maintained always at a prescribed distance.

In the same figuge, 9 is a potentiometer continuously issuing a signal of the vertical position of the torch 3 moving vertically up and down relative to the groove 6 as a value of voltage; 16 is a horizontal movement motor controller for driving the horizontal movement motor 15 and reversing the rotating direction thereof by a pulse sent from a comparator described later; and 17 is a driving speed setter for setting rotating speed of the horizontal movement motor 15.

Further, 18 is a roller follower vertically movably fitted to the carriage through a spring or other suitable means so as to be always in contact with the surface of the object of welding 1'; 19 is a support stock supporting the roller follower 18; and, 20 is a potentiometer for continuously issuing a signal of the distance of vertical movement of the roller follower 18 as a value of voltage. The value of voltage issued by the potentiometer 20 is null when the distance between the carriage and the object of welding 1' is equal to the previously set value, i.e., when the rails or the object of welding 1' have no vertical curvature, whereas it is higher according as said distance becomes longer, and is lower according as said distance becomes shorter. That is, the potentiometer 20 continuously issues a signal of the deviation of the distance between the carriage and the object of welding 1' from the previously set distance as a value of voltage. The value of voltage issued by the potentiometer 20 is equal to the value of voltage issued by the potentiometer 9 when the torch 3 is vertically moved up and down in response to variations in the distance between the carriage and the object welding 1'. In the same figure, 21 is a setter which issues a signal of the value of voltage corresponding to a previously set depth from the top of the groove 6 to a differential amplifier described later for reversing the direction of movement of the torch 3 in the width direction of the groove 6. Said value of voltage varies for each welding pass when applying the multi-layer welding to the groove 6, since the reversing depth of the torch 3 varies for each welding pass. A differential amplifier 22 calculates a sum of said value of voltage received from the setter 21 and a value of voltage corresponding to a deviation of a distance between the carriage and the object of welding 1' detected by the potentiometer 20 from the previously set distance, and amplifies the value of the above sum to a certain level; 23 is a comparator which issues to the horizontal movement motor controller 16 a reversing signal which reverses the moving direction of the torch 3 in the width direction of the groove 6 at the moment when the value of voltage continuously issued by the potentiometer 9 agrees with the value of voltage calculated by said differential amplifier 22; and, 24 is a DC constant-current electric power source for welding connected between the object of welding 1' and the torch 3.

For each movement of the torch 3 in the width direction of the groove 6, the vertical position of the torch 3 is continuously detected by the potentiometer 9 as a value of voltage ($e_V$). This detected value of voltage ($e_V$) is sent to the comparator 23. The potentiometer 9 is arranged so that a higher value of voltage is produced according as the torch 3 goes down toward the bottom face 5 of the groove 6. By this arrangement, the value of voltage ($e_V$), which becomes higher according as the torch 3 goes down along the inclined face 4 on one side toward the bottom face 5 in the groove 6 and becomes lower according as the torch 3 goes up from the bottom face 5 along the inclined face 4' on the other side in this groove 6, is sent from the potentiometer 9 to the comparator 23.

On the other hand, a signal of the value of voltage ($e_{V'}$) corresponding to the deviation of the distance between the carriage and the object of welding 1' from the previously set distance is continuously issued by the potentiometer 20 to the differential amplifier 22. The differential amplifier 22 calculates the sum of the value of voltage ($e_H$) which is previously set by the setter 21 and the value of voltage ($e_{V'}$) which is corresponding to the deviation of the distance between the carriage and the object of welding 1' from the previously set distance, and issues this calculated sum of the value of voltage ($e_H + e_{V'}$) to the comparator 23 as a signal of the value of voltage indicating the reversing position of the torch 3.

The comparator 23 compares, for each movement of said torch 3, the value of voltage ($e_V$) indicating the vertical position of the torch 3 detected continuously by the potentiometer 9 with the value of voltage ($e_H + e_{V'}$) indicating the reversing position of the direction of movement of said torch 3 to issue a movement reversing signal of the torch 3 to the horizontal movement motor controller 16 when said value of voltage ($e_V$) agrees with said value of voltage ($e_H + e_{V'}$). The horizontal movement motor controller 16 reverses the rotation of the horizontal movement motor 15 by means of said reversing signal of the direction of movement. As a result, the rotating direction of the horizontal screw stock 14 is reversed, thus resulting in the reversal of the direction of movement of the torch 3 in the width direction of the groove 6 through the action of the fitting 7' engaging threadably with the horizontal screw stock 14.

The above-mentioned movements of the torch 3 in the width and the vertical directions of the groove 6 and the reversal of the direction of movement of the torch 3 in the width direction of the groove 6 are repeated, thereby reciprocally moving the tip of the welding electrode 2 in the width direction of the groove 6, following the face of the groove 6, while maintaining the distance between the tip of the welding electrode 2 and the groove 6 always at a prescribed distance, and at the same time, moving the welding electrode 2 in the longitudinal direction of the groove 6, thus to weld the objects of welding 1 and 1' together in the longitudinal direction of the groove 6. Multi-layer welding is thus applied in the groove 6 by repeating the steps as mentioned above, and welding of the objects of welding 1 and 1' is completed.

Now, the present invention is described with reference to FIGS. 1 and 2 for an example in which, the travelling rails for the welding machine carriage laid in parallel with the groove 6 on the object of welding 1' partially curves upward relative to the object of welding 1' although the object of welding 1' has a flat face.

When the distance between said carriage travelling on said rails and the object of welding 1' is equal to the previously set distance, the value of voltage ($e_{V'}$) of a signal issued by the potentiometer 20 to the differential amplifier 22 is null. Therefore, a signal of the value of voltage ($e_H$) previously set by the setter 21 is issued as it is to the comparator 23 as a signal of the value of voltage indicating the reversing position of the torch 3. When the value of voltage ($e_V$) of the signal issued by the potentiometer 9 and indicating the position of the torch 3 agrees with said value of voltage of the signal indicating the reversing position of the torch 3, a reversing signal is issued by the comparator 23 to the horizontal movement motor controller 16, resulting in the reversal of the moving direction of the torch 3.

On the other hand, when said carriage comes to the point on the rails curving upward relative to the object welding 1', the distance between said carriage and the object of welding 1' becomes longer than the previously set distance (L). As a result, a signal of a value of voltage ($e_{V'}$) corresponding to the deviation ($\Delta L$) of the distance between said carriage and the object of welding from said distance (L) is issued by the potentiometer 20 to the differential amplifier 22. This value of voltage ($e_{V'}$) is higher than said value of voltage ($e_V$), i.e., 0 V. The differential amplifier 22 calculates the sum of said value of voltage ($e_{V'}$) and the value of voltage ($e_H$) previously set by the setter 21, and this calculated sum of the value of voltage ($e_H + e_{V'}$) issued to the comparator 23 as a signal of the value of voltage indicating the reversing position of the torch 3. When the value of voltage ($e_V$) of the signal issued by the potentiometer 9 and indicating the vertical position of the torch 3 agrees with said sum of the value of voltage ($e_H + e_{V'}$), a reversing signal is issued by the comparator 23 to the horizontal movement motor controller 16. As a result, in spite of the change in the distance between the carriage and the object of welding 1', the torch 3 moves along the groove 6 in the longitudinal direction thereof while accurately reversing the moving direction at the previously set reversing position. Thus, a bead of a uniform height is formed in the groove 6, enabling to satisfactorily weld the objects of welding 1 and 1'.

In the above example, the torch 3 rises by said distance ($\Delta L$) together with the carriage, whereas, as mentioned above, the electrode 2 is controlled so that the distance between the tip of the electrode 2 and the groove 6 is always kept at a prescribed distance (l). In other words, the torch 3 descends by said distance ($\Delta L$). As a result, the value of voltage ($e_{Y'}$) of the signal issued by the potentiometer 9 and indicating the vertical position of the torch 3 is higher than said value of voltage ($e_Y$). The value of voltage representing the difference between said value of voltage ($e_{Y'}$) and said value of voltage ($e_Y$) is equal to said value of voltage ($e_{V'}$) of the signal issued by the potentiometer 20.

The above-mentioned example has covered a case in which the rails for travelling the carriage partly curve upward relative to the object of welding 1'. However, when said rails partly curve downward relative to the object of welding 1', or when, although said rails are laid straight on the object of welding 1', the object of welding 1' curves upward or downward, the torch 3 accurately reverses its moving direction at the previously set reversing position as in the case of the above-mentioned example.

Also in the above-mentioned example, the distance between the tip of the welding electrode 2 and the groove 6 has been maintained at a certain distance by detecting the arc voltage with the use of a constant-current electric power source and controlling the vertical position of the torch 3 so as to keep this arc voltage always at a prescribed value. This may also be accomplished by detecting the arc current with the use of a constant-voltage electric power source in place of the arc voltage, and controlling the vertical position of the torch 3 so as to keep this arc current always at a prescribed value.

According to the automatic arc-welding method of the present invention as described above, when reciprocally moving a welding torch directed substantially vertically toward a groove formed between objects of welding, following the face of said groove, in the width direction of the groove, and, at the same time, moving said torch in the longitudinal direction of said groove to automatically arc-weld the objects of welding together in the longitudinal direction of said groove, it is possible to accurately reverse the direction of movement of the reciprocating torch in the width direction of the groove automatically at a previously set distance from the top of the groove, even if the distance between the carriage fitted with the torch and the objects of welding varies. It is therefore possible to form a bead always with a constant height in the groove therein, resulting in a satisfactory penetration and hence excellent weld without welding defects, thus providing industrially useful effects.

What is claimed is:

1. In an automatic arc-welding method, which comprises: continuously moving a carriage along the longitudinal direction of a groove formed between objects of welding; fitting a welding torch to said carriage so that said torch is directed substantially vertically to said groove, said torch moving together with said carriage; directing a welding electrode through said torch toward said groove; feeding a welding current to said electrode to produce an arc between the tip of said electrode and said groove to weld said objects of welding together by means of the arc heat along said groove; continuously moving said torch, during travel of said carriage, in the width direction of said groove while continuing welding; continuously detecting a value ($E_v$) of the arc voltage or arc current of said arc; continuously calculating a deviation ($E_o - E_v$) of the thus detected value ($E_v$) from a previously set value ($E_o$) of the arc voltage or arc current; continuously moving said torch vertically up and down, during travel of said carriage, so that said deviation ($E_o - E_v$) becomes null, thereby maintaining the distance between the tip of said electrode and said groove always at a prescribed distance (l) during the movement of said torch in the width direction of said groove; continuously detecting a vertical position of said torch as a value of voltage ($e_Y$) indicated by a potentiometer for each movement of said torch in the width direction of said groove; reversing the direction of movement of said torch in the width direction of said groove at the moment when said value of voltage ($e_Y$) thus detected agrees with a prescribed value of voltage; repeating said movement of said torch in the width direction of said groove, said movement of said torch in the vertical direction and said reversal of the direction of the movement of said torch in the width direction of said groove; on the other hand, continuously moving said torch in the longitudinal direction of said groove, while continuing welding, together with said carriage; thereby reciprocally moving said torch in the width direction of said groove following the face of said groove while maintaining the distance between the tip of said electrode and said groove always at said prescribed distance (l), and, at the same time, moving said torch in the longitudinal direction of said groove so as to weld said objects of welding in the longitudinal direction of said groove;

the improvement characterized by:

said prescribed value of voltage, for one movement of said torch in the width direction of said groove, for the purpose of reversing the direction of movement of said torch in the width direction of said groove being equal to a value of the sum ($e_H + e_V$) of a previously set value of voltage ($e_H$) and a value of voltage ($e_V$) corresponding to a deviation ($\Delta L$) of the distance between said carriage and said objects of welding from a previously set distance (L).

2. The method as claimed in claim 1, wherein:

said value of voltage ($e_V$) corresponding to said deviation ($\Delta L$) of said distance between said carriage and said objects of welding from said previously set distance (L) is continuously detected by a separate potentiometer.

* * * * *